United States Patent
Maimone et al.

(10) Patent No.: US 7,095,594 B2
(45) Date of Patent: Aug. 22, 2006

(54) ACTIVE READ/WRITE HEAD CIRCUIT WITH INTERFACE CIRCUIT

(75) Inventors: Peter Maimone, Irvine, CA (US); Al Morton, Placentia, CA (US); Chi-Fa Chiou, Lake Forest, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/953,739

(22) Filed: Sep. 17, 2001

(65) Prior Publication Data

US 2003/0142445 A1 Jul. 31, 2003

Related U.S. Application Data

(60) Provisional application No. 60/253,506, filed on Nov. 28, 2000.

(51) Int. Cl.
  *G11B 5/54* (2006.01)
(52) U.S. Cl. ............... 360/244.1; 360/245.8; 360/234.5; 360/234.6
(58) Field of Classification Search ............ 360/234.4, 360/234.5, 234.6, 264.2, 244.1, 245.8, 245.9
  See application file for complete search history.

(56) References Cited

U.S. PATENT DOCUMENTS

| | | | | |
|---|---|---|---|---|
| 4,809,103 A | | 2/1989 | Lazzari .................... 360/234.5 |
| 5,006,946 A | | 4/1991 | Matsuzaki ............... 360/245.9 |
| 6,002,550 A | * | 12/1999 | Amemiya et al. ....... 360/234.5 |
| 6,046,882 A | * | 4/2000 | Pattanaik et al. ............ 29/878 |
| 6,055,132 A | * | 4/2000 | Arya et al. ............... 360/245.9 |
| 6,069,774 A | * | 5/2000 | Arisaka et al. .......... 360/245.3 |
| 6,078,471 A | * | 6/2000 | Fiske ....................... 360/254.2 |
| 6,134,075 A | * | 10/2000 | Bennin et al. ............ 360/245.9 |
| 6,151,196 A | * | 11/2000 | Carlson et al. .......... 360/245.9 |
| 6,169,643 B1 | * | 1/2001 | Iwamoto .................. 360/245.9 |
| 6,188,546 B1 | * | 2/2001 | Nakajima et al. ........ 360/234.5 |
| 6,201,667 B1 | * | 3/2001 | Yamamoto et al. ....... 360/264.2 |
| 6,239,947 B1 | * | 5/2001 | Fan et al. ................ 360/245.9 |
| 6,252,743 B1 | * | 6/2001 | Bozorgi ................... 360/244.1 |
| 6,266,213 B1 | * | 7/2001 | Hiraoka ................... 360/244.1 |
| 6,330,134 B1 | * | 12/2001 | Kameyama .............. 360/245.4 |
| 6,342,990 B1 | * | 1/2002 | Sasaki ........................ 360/126 |
| 6,351,351 B1 | * | 2/2002 | Takasugi ................. 360/245.9 |

(Continued)

OTHER PUBLICATIONS

Fillion, et al., Conformal Multichip-on-Flex (MCM-F) Technology, The International Journal of Microcircuits and Electronic Packaging, vol. 18, No. 4, Fourth Quarter 1995 (ISSN 1063-1674), pp. 328-335.

(Continued)

*Primary Examiner*—Jefferson Evans
(74) *Attorney, Agent, or Firm*—Warren L. Franz; W. James Brady, III; Frederick J. Telecky, Jr.

(57) ABSTRACT

A method and apparatus for collocating an interface circuit with a disk drive read/write head is described. In one embodiment the interface circuit is attached to the load arm on one side and the miniflex interconnect on the other. The read/write head is mounted on the miniflex directly below the interface circuit. The interface circuit comprises a read signal preamplifier, a write driver, and head selection circuitry. A common multiplexer circuit is used to perform the other conventional read/write circuit functions. The common multiplexer circuit includes a head selection block to determine which heads are activated, a head driver block, and a read receiver block. The common multiplexer circuit is mounted at the base of the miniflex.

4 Claims, 4 Drawing Sheets

U.S. PATENT DOCUMENTS 6,394,888 B1 * 5/2002 Matsumoto et al. ........ 451/548
6,400,529 B1 * 6/2002 Baba et al. .............. 360/234.4

OTHER PUBLICATIONS

Bawa, et al., Fracture Strength of Large Diameter Silicon Wafers, Semiconductor International, Nov. 1995, pp. 115-118.

Coughlin, et al., Design Trends in Head/Gimbal Assemblies for Hard-Disk Drives, Data Storage, May/Jun. 1995, pp. 23-31.

IBM Sets New Density Record in Stored Data, Data Storage, Technology Update, May/Jun. 1995, pp. 9-10.

Planar Heads on Silicon Sliders Set to Take Off, Data Storage, Technology Update, Sep./Oct. 1995, pp. 9-12.

Hitchner, et al., Magnetic Head Assembly and Electronic Circuitry, IBM Technical Disclosure Bulletin, vol. 2, No. 7A Dec. 1982, p. 3266.

* cited by examiner

ACTIVE READ/WRITE HEAD CIRCUIT WITH INTERFACE CIRCUIT

This application claims priority under 35 USC § 119(e)(1) of provisional application Ser. No. 60/253,506, filed Nov. 28, 2000.

FIELD OF THE INVENTION

This invention relates to the field of magnetic recording, and more specifically to disk drive head-arm assemblies.

BACKGROUND OF THE INVENTION

Disk drive read channel parasitics are a major limiting factor of further improvements in disk drive performance. The long wires that typically connect disk drive heads to interface electronics are a primary source of some of these parasitics. Also, typical yield loss for high sensitivity magnetoresistive vertical disk drive heads is over 33%. To better understand these problems, it is important to understand the following aspects of disk drive technology.

Disk drive memory systems ("disk drives") have been a popular means for storing computer-generated information for many years. In magnetic disk drives, digital information is typically recorded as bits on concentric tracks on disks comprised of a material capable of maintaining a magnetic field. Each stored digital bit is represented by a region of magnetic particles on the disk. Whether the bit is a 1 or a 0 is indicated by the orientation of the magnetic field on the disk.

Common disk drives may include several disks mounted on a single spindle and stacked vertically, with a gap between each disk. Data is written to and read from the surface of each disk by means of a magnetic read/write head located on a load arm assembly. If two disks are use in a drive, a "E" assemble is used to provide a assembly for the disks. A mux circuit physically electronically located between the two disk is used to multiply the control signals and data signals for the heads. The mux current acts as leading factors in the place of any preamplifier circuit. In high performance, high-density hard disk drives, typically eight or more disks may be stacked on the same spindle. Since the read/write head must be able to fit between the disks to read or write data, the minimum distance possible between adjacent disks is limited by, among other things, the vertical thickness of the head-arm assembly. Data is typically stored on both sides of each disk. Therefore, there are usually two head-arm assemblies located in the gap between adjacent disks.

Prior art head-arm assemblies typically consist of a load arm, with a magnetic read/write head mounted on one end of the arm, and a miniflex interconnect, to connect the read/write head to the head interface electronics. The head interface electronics are typically mounted at the base of the head-arm assembly. Head interface electronics typically include a write current driver, a read amplifier, and a multiplexer for the write current driver, multiplexing and control circuitry. The write current driver provides the current required to produce a magnetic field to define the magnetic orientation of a region of particles on the magnetic disk. The read amplifier amplifies the small amplitude electrical signals produced by changes in the magnetic field orientation between regions of the magnetic recording disk. The multiplexing and control circuitry connect the write current driver and read amplifier to the selected read/write head or heads. Typically, the read/write head is connected to the interface circuit using thin wires. These thin wires often introduce parasitic capacitance and inductance into the read channel because of the relatively long length of the wires compared to the other read channel circuit components. These parasitic effects are undesirable because they may reduce the read channel's frequency response and available head voltage swing.

One conventional disk drive head is known as a vertical head. Magnetoresistive (MR) type vertical heads are currently in widespread use. MR vertical heads typically comprise a magnetoresistive read head and a traditional thin-film inductive write head. Vertical MR heads are typically manufactured using a semi-batch process in which head coils are deposited on a ceramic wafer (typically aluminum oxide or silicon carbide). These wafers are sliced into bars, which are turned 90 degrees for grinding. Photolithography and etching are then used to produce an air-bearing surface on one side of the bar. The bars are then diced into individual heads with read and write coils located at opposite ends of each head.

One way to improve data storage and retrieval speeds in a disk drive system, as well as the overall capacity of the disk drive, is to increase the rotational speed of the disks. Alternatively, the data density (digital bits/disk area) may be increased. However, the parasitics caused by the wires connecting the read/write head to the interface electronics limit the bandwidth and the minimum pulse amplitude that can be transmitted through the read channel. Thus, these wires limit the performance improvements that can be provided by increasing the disk speed or data density in a disk drive system.

High sensitive MR read heads have been developed to detect the low-level magnetic flux changes present on high-density data disks. These MR read heads improve disk drive performance by detecting the flux changes of smaller magnetic disk regions than could be accurately detected with the previous generation of MR read heads. Unfortunately, the magnetic sensitivity of these MR read heads also makes them highly sensitive to Electronic Static Discharge (ESD), the discharge of static electricity that results when a high voltage is formed from static electricity across a thin insulator region. When this ESD voltage exceeds a threshold voltage for that insulator region, the insulator breaks down, allowing a charge to move across the region to eliminate the voltage difference. This movement of the charge through the insulator generally destroys the sensitive circuit elements of the MR read head. ESD failures are a serious yield problem, and may cause MR read head yield losses as great as 60%. Thus, there is a need for a new disk drive head-arm assembly that both reduces the parasitics of the read channel and protects the head from ESD effects.

An alternative to a vertical head, called the planar head, has been developed for use in disk drive systems. One planar silicon head in use today is comprised of a nickel-iron coil deposited on the surface of a silicon wafer. Approximately twenty mask layers are required to construct the skis and air bearing surfaces on the wafer, and to deposit the read/write coils planar to the silicon surface. Unlike conventional vertical thin-film conductive heads, a single planar head typically performs both read and write operations.

Head-arm assemblies have been described with magneto-diodes or transistors deposited on the back side of the planar head wafer to provide preamplification and multiplexing functions to the heads while reducing the parasitics caused by connecting the head to a separate interface circuit. However, such techniques cannot be used with conventional vertical heads. Thus, an improved head-arm assembly is needed to reduce parasitics and improve the yield of conventional vertical heads.

SUMMARY OF THE INVENTION

The present invention relates to a method and apparatus for collocating an interface circuit with a disk drive read/write head. In one embodiment, one side of the interface circuit is attached to the load arm and the other side of the interface circuit is attached to a miniflex interconnect. The read/write head is mounted on the miniflex directly below the interface circuit. Collocating the interface circuit and read/write head eliminates the parasitics caused by the comparatively long wires used in the prior art to connect the read/write head to interface circuits mounted at the base of the head-arm assembly.

The interface circuit comprises a read signal preamplifier, a write driver, and head selection circuitry. A common multiplexer circuit is used to perform the other conventional read/write circuit functions. The common multiplexer circuit includes a head selection block to determine which heads are activated, a head driver block, and a read receiver block. The common multiplexer circuit is mounted at the base of the head-arm assembly.

DETAILED DESCRIPTION OF THE PRESENT INVENTION

The present invention is directed to a method and apparatus for an active read/write head. In the following description, numerous specific details are set forth to provide a more thorough understanding of the present invention. It will be apparent, however, to one skilled in the art, that the present invention may be practiced without these specific details. In other instances, well-known features have been described in detail so as not to unnecessarily obscure the present invention.

The present invention provides a method and apparatus for collocating an interface circuit with a disk drive read/write head. In one embodiment, one side of the interface circuit is attached to the load arm and the other side of the interface circuit is attached to a miniflex interconnect. The read/write head is mounted on the miniflex directly below the interface circuit. Collocating the interface circuit and read/write head reduces or eliminates the parasitics caused by the comparatively long wires used in the prior art to connect the read/write head to interface circuits mounted at the base of the head-arm assembly.

In one embodiment of the invention, the interface circuit comprises a read signal preamplifier, a write driver, and head selection circuitry. A common multiplexer circuit performs other conventional read/write circuit functions. The common multiplexer circuit includes a head selection block to determine which heads are activated, a head-driver block, and a read receiver head 104 to minimize the thickness of the head-interface circuit assembly, as shown in FIG. 2.

Figure 1:
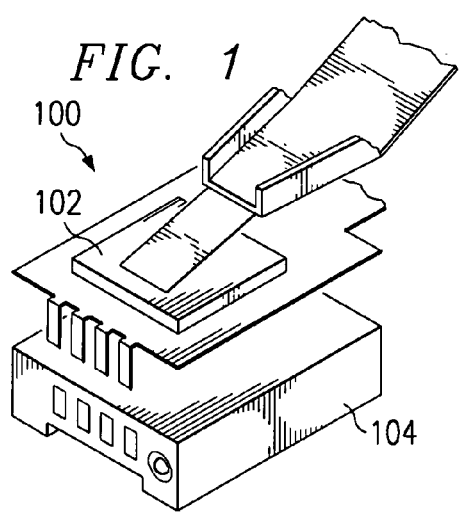
FIG. 1 is a head-arm assembly for use in one embodiment of the present invention.
Figure 2:
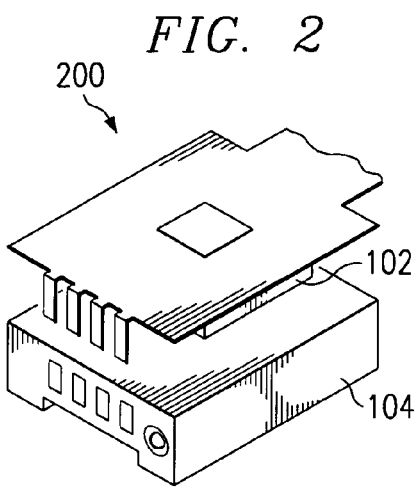
FIG. 2 is an alternative head-arm assembly for use in one embodiment of the present invention.

In addition to reducing the parasitics in the read channel, collocating interface circuit 102 and head 104 as shown in FIGS. 1 and 2 protects the head from ESD damage. Interface circuit 102 isolates head 104 from static charge and other potential voltage sources because transistor 426 will dissipate most static charge build-up from the inputs of the head-arm assembly and thereby protect head 104. Thus, collocating interface circuit 102 and head 104 substantially reduces yield loss caused by ESD breakdown of the MR read head.

The head interface circuit combination of FIGS. 1 and 2 can be fabricated by a variety of techniques. For example, the following processes can be used: conventional flip chip, solder bumped flex, deposition of a dielectric onto a metal substrate, or micro SMT™ from Chipscale. In the solder bump fabrication process, after the solder bumps have been placed on a wafer, the wafer is backgrinded to reduce the thickness of the wafer so as to maintain a small profile for the head-chip combination.

Figure 3A:
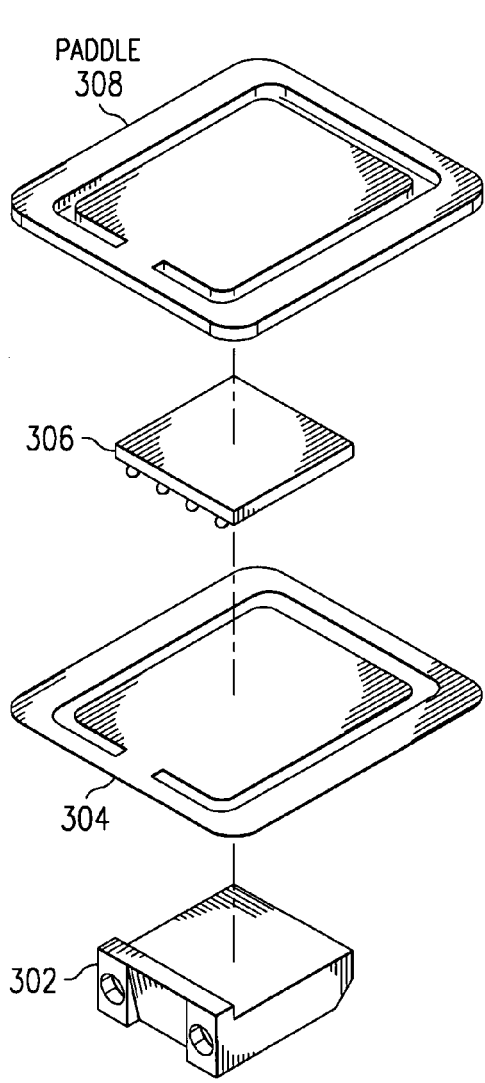
FIG. 3a is another head arm assembly for use in another embodiment of the present invention.

FIG. 3 illustrates a alternate embodiment of the head-arm assembly used with the present member. In this embodiment, the head slider unit 302 is directly attached to flex interconnect 304 on a first side 302. The integrated circuit 306 is directly connected to the flex/interconnect 304 at a second side. In addition, a suspension flexure unit 308 is directly connected over the integrated circuit 306. As a consequence, the integrated circuit 306 is sandwiched between. As the integrated circuit may include such circuits as the preamplifier and other analog circuits of the present invention. In addition, by virtue of the fact that the integrated circuit 306 is closely connected to the head slider unit 302, by virtue of the fact that it is substantially positioned over the head slider unit 302, the parasitic capacitance is significantly reduced as a result of the fact that long lines are not required through the flex interconnect unit 304 to connect to the integrated circuit 306.

Figure 3B:
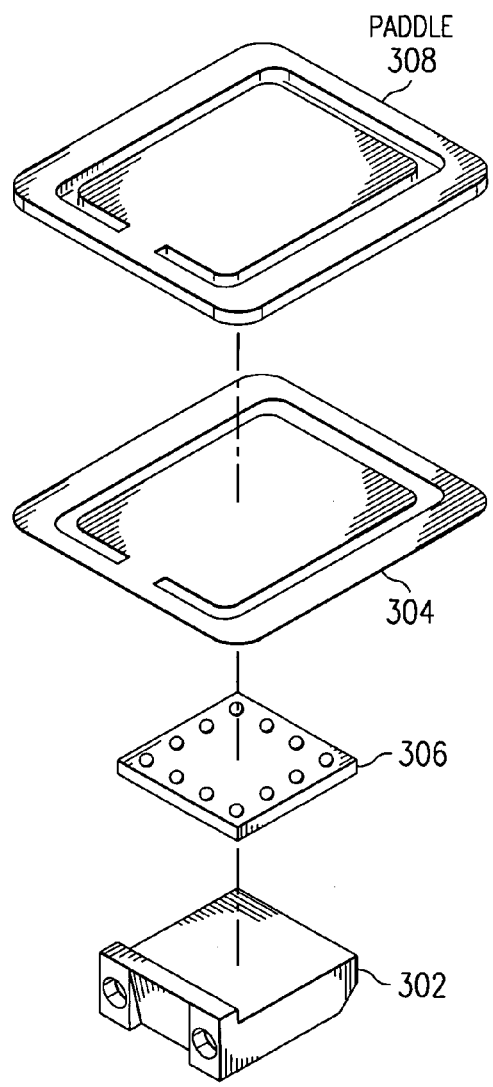
FIG. 3b is another head arm assembly for use in another embodiment of the present invention.

FIG. 3b illustrates another head-arm assembly after present unit. In FIG. 3b the integrating circuit 306 is positional between the flex interconnect 304 at the head slider unit 302. As a consequence the integrated circuit 306 is dually connected to head/slider unit 302.

Figure 6:
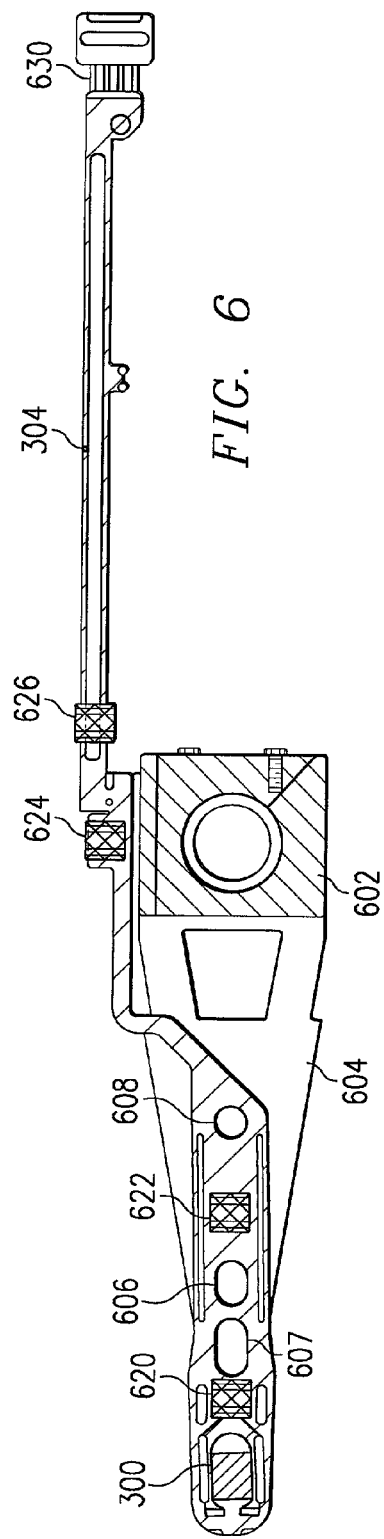
FIG. 6 is a head arm assembly with flex for use with the present invention.

FIG. 6 illustrates a head gimbal assembly used in connection with the present invention. Note particularly the head gimbal assembly includes head 300, flex interconnect unit 304, base plate 602 and load beam 604. Additionally, the flex interconnect unit 304 includes a hole 606 and hole 608 for attachment of the flex interconnect unit 304 to the load beam 604. FIG. 6 illustrates various positions for locating the integrated circuit 306; although any position of flex interconnect unit could be used for integrated circuit 306. FIG. 6 illustrates four positions for the integrated circuit 306, namely first position, 620; second position 622; third position 624 and fourth position 626. Along the flex interconnect 304, the first position 620 for the integrated circuit 306 is positioned behind the head slider unit 302 but in front of hole 607. A second position 622 is located in front of the base plate 602 but behind the hole 606 and in front of the hole 608. A third position is essentially adjacent to the center point of the base plate 602. A fourth position 626 is positioned on the flex interconnect unit 304 and positioned behind the third position 626 away from the head slider 302. The flex interconnect unit 304 is connected to connector 630 to the connect to the read channel.

In addition to the removal of parasitic capacitance by the removal of the long lines along the flex interconnect structure, the structure of the head slider 302 being connected close to the integrated circuit 306 has an additional advantage of ESD protection. With the head being far away from the integrated circuit, there is an additional likelihood of noise entering the flex interconnect unit 304 while the head slider unit 302 is being mounted. The head slider unit 302 is expensive and prone to destruction from such introduction of noise. Placing the integrated circuit 306 in close proximity to the head slider unit 302 results in ESD protection for the head slider unit 302 since the ESD units of the integrated circuits 306 act to prevent noise from entering the head slider unit 302 since any noise introduced on flex interconnect 304 travels through integrated circuit 306 and the associated ESD circuits of integrated circuit 306. These ESD circuits for integrated circuit 306 eliminates the electrostatic noise.

Figure 7:
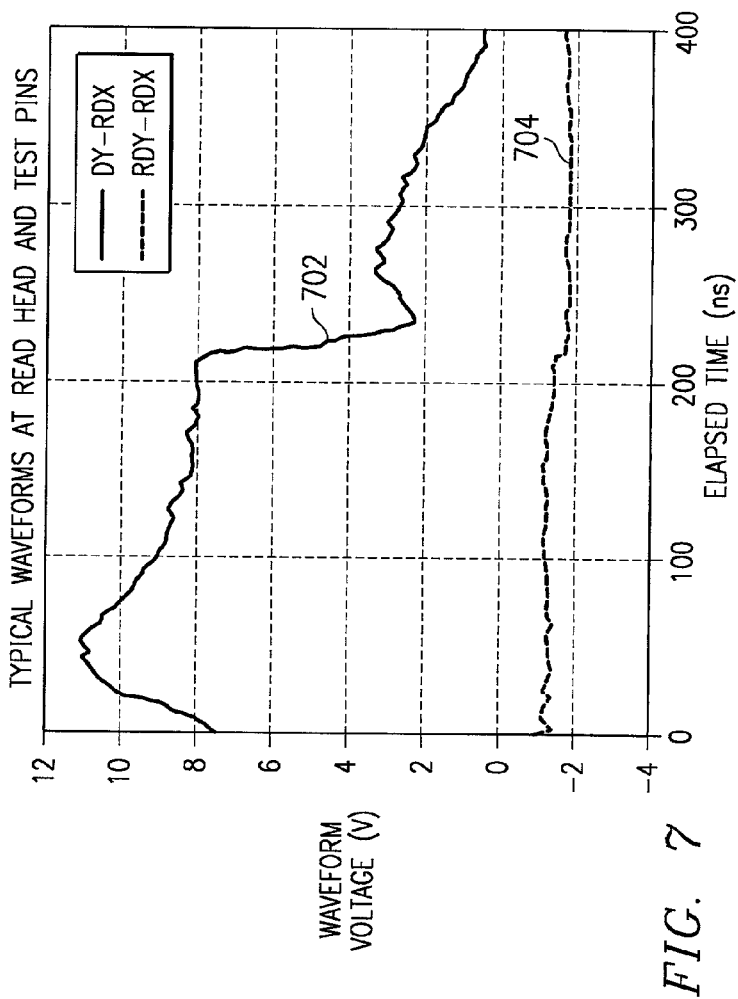
FIG. 7 is a waveform for use with the present invention.

Turning now to FIG. 7, the upper curve 702 illustrates a typical wave form at the read head. As illustrated, the curve 702 shows a sharp increase as delayed time is increased representing a electrostatic charge being introduced to the flex interconnect structure 304. As illustrated, the curve 702 fluctuates rapidly over a wide range. In contrast, the curve 704 is the voltage read at the input terminals of the read head. Correspondingly, it can be seen that the electrostatic voltage has been effectively removed from this terminal as a result of the ESD protection of the integrated circuit 306. As a consequence, the head has been protected.

Figure 4:
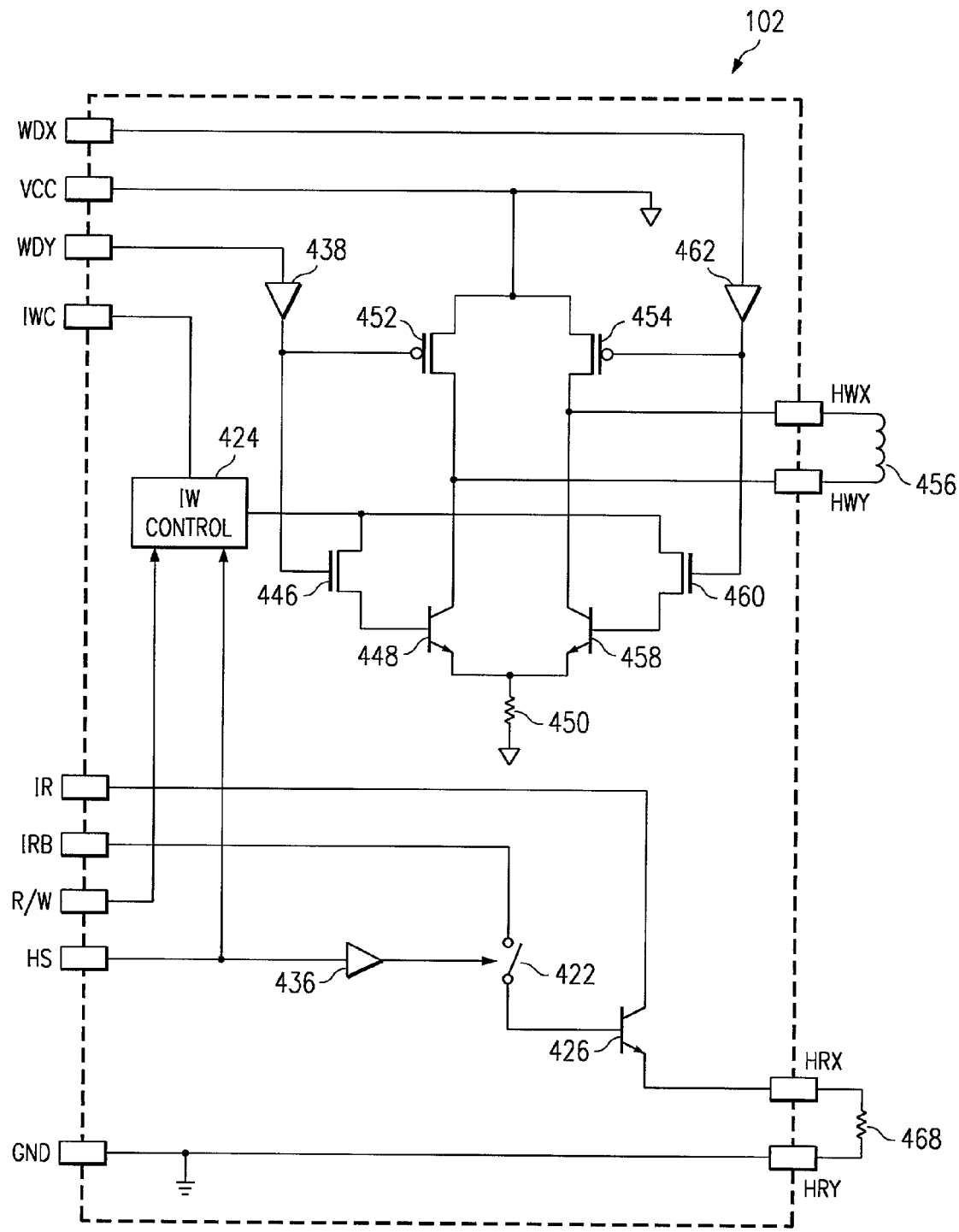
FIG. 4 is a circuit diagram illustrating an interface circuit for use in one embodiment of the present invention.

FIG. 4 illustrates an embodiment of an active read/write head interface circuit of the present invention. The write head sub-circuit comprises the following elements. Transistors 448, 452, 454 and 458 form a differential amplifier. Write driver 438 has an external pin input $W_{DY}$ and an output coupled to the gate of PMOS transistor 452 and the gate of NMOS transistor 446. The drain of transistor 452 is coupled to external pin $V_{CC}$, and the source is coupled to write head element 456 via external pin $H_{WY}$. The source of transistor 452 is also coupled to the collector of NPN transistor 448. The base of transistor 448 is coupled to the source of transistor of 446. The emitter of transistor 448 is coupled to the first terminal of resistor 450. The second terminal of resistor 450 is coupled to external pin GND.

On the right side of the differential amplifier, the drain of PMOS transistor 454 is coupled to external pin $V_{CC}$. The gate of transistor 454 is coupled to the output of driver 462. The output of driver 462 is also coupled to the gate of transistor 460. The input of driver 462 is coupled to external pin $W_{DX}$. The source of NMOS transistor 460 is coupled to the base of transistor 458. The collector of NPN transistor 458 is coupled to the source of transistor 454 and to write head element 456 via external pin $H_{WX}$. The emitter of transistor 458 is coupled to the first terminal of resistor 450.

The drains of transistors 446 and 460 are coupled to write current controller $I_W$ Control. $I_W$ Control is also coupled to external pins $I_{WC}$, $R/_W$, and $H_S$.

The read head element sub-circuit is in the lower section of FIG. 4. The collector of NPN transistor 426 is coupled to external pin $I_R$. The emitter of transistor 426 is coupled to the first terminal of read head element 468 via external pin $H_{RX}$. The second terminal of read head element 468 is coupled to GND via external pin $H_{RY}$. The base of transistor 426 is coupled to the first terminal switch 422. The control terminal of switch 422 is coupled to the output of driver 436. The input of driver 436 is coupled to external pin $H_S$. The second terminal of switch 422 is coupled to external pin $I_{RB}$.

Figure 5:
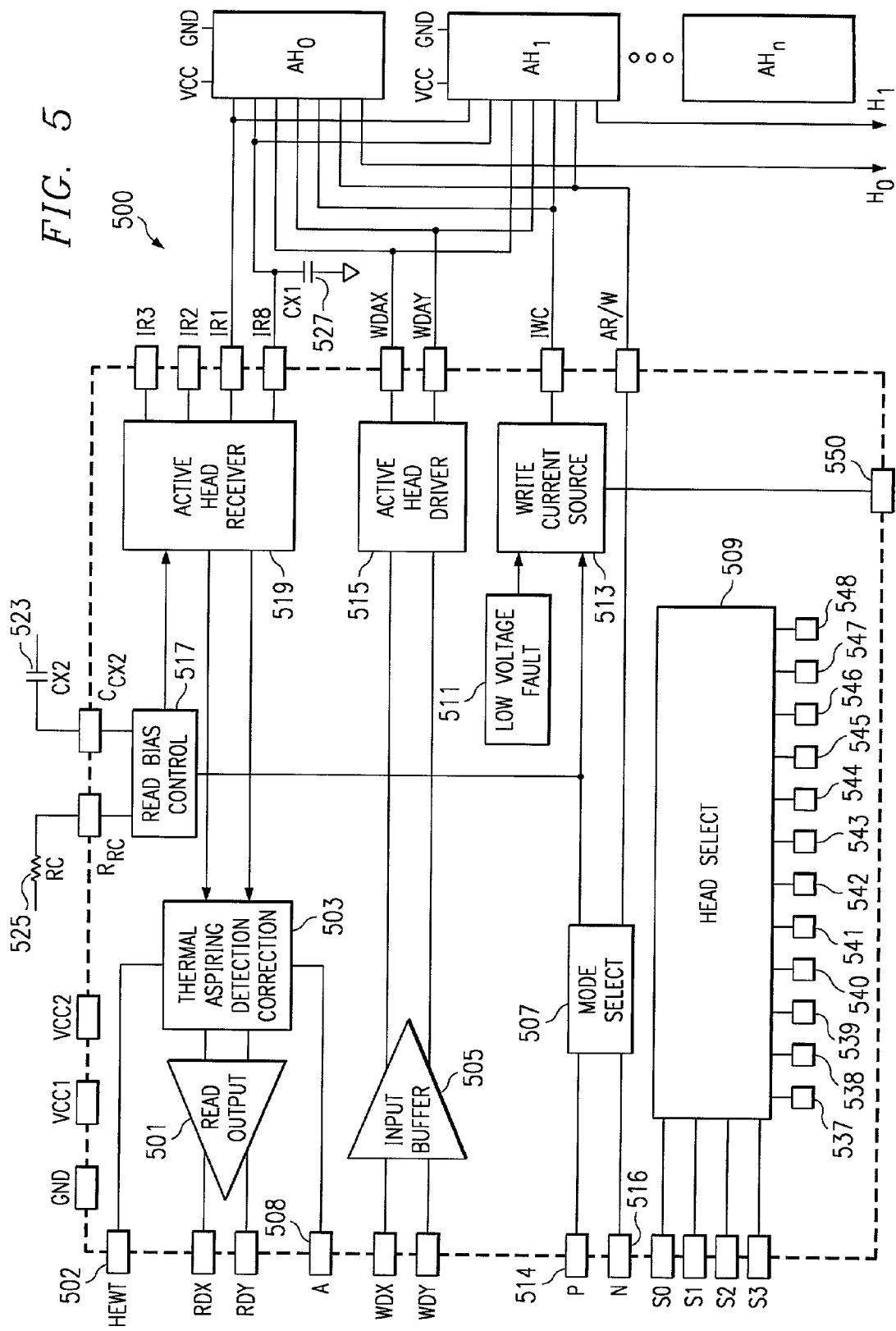
FIG. 5 is a circuit diagram illustrating a common multiplexer circuit for use in one embodiment of the present invention.

FIG. 5 illustrates a common multiplexer circuit for use in one embodiment of the present invention. Element $AH_0$ represents a first head interface circuit as shown in greater detail in FIG. 4. A typical disk drive has a plurality of read/write heads 104, and therefore a plurality of interface circuits, as indicated by elements $AH_1$ through $AH_n$.

The read circuitry of common multiplexer circuit 500 includes Active Head Receiver 519, which has external pins $IR_B$, $IR_1$, $IR_2$ and $IR_3$. A first terminal of external capacitor $C_{X1}$ is coupled to ground. Active Head Receiver 519 has two outputs coupled to Thermal Asperity Detection Correction block 503. Thermal Asperity Detection Correction block 503 is coupled to two external pins 502 and 508. Thermal Asperity Detection Correction block 503 is coupled to the inputs of Read Output 501. Read Output has two outputs to external pins $R_{DX}$ and $R_{DY}$.

Read Bias Control 517 is coupled to external pins $R_{RC}$ and $C_{CX2}$. Pin $R_{RC}$ is coupled to a first terminal of external resistor $R_C$. Pin $C_{CX2}$ is coupled to a first terminal of external capacitor $C_{X2}$. A third terminal of Read Bias Control 517 is coupled to a first terminal of Mode Select 507. Mode Select 507 has a second terminal coupled to external pin 514, a third terminal coupled to external pin 516, and a fourth terminal coupled to external pin $A_{R/W}$. The first terminal of Mode Select 507 is further coupled to a first terminal of Write Current Source 513.

The disk drive write section of common multiplexer circuit 500 includes Write Current Source 513 which has a second terminal coupled to Low Voltage Fault block 511, a third terminal coupled to external pin $I_{WC}$, and a fourth terminal coupled to external pin 550. Active Head Driver 515 has a first input coupled to a first output coupled to a first output of Input Buffer 505, a second input coupled to a second output of Input Buffer 505, a first output coupled to external pin $W_{DAX}$, and a second output coupled to external pin $W_{DAY}$. Input Buffer 505 has a first input coupled to external pin $W_{DX}$, and a second input coupled to external pin $W_{DY}$.

The control section of common multiplexer circuit 500 includes Head Select block 509, which has external control line pins S0, S1, S2, and S3, as well as head selection line output pins 537–548.

In operation, Head Select block 509, (FIG. 5) controls which read/write heads 104 are active. Head control lines S0, S1, S2, and S3 are digital selection lines, which control which head selection lines 537–548 are selected. Each head selection line is coupled to an $H_S$ pin on interface circuit 102, shown in detail in FIG. 4. When $H_S$ is high, switch 422 closes thereby turning on transistor 426 and coupling read head 468 to external pin $I_R$. $I_R$ is, in turn, coupled to Active Head Receiver 519. Thus, when a magnetic flux change is detected by the read/write head 102 selected by Head Select 509, the detected signal passes through transistor 426 to external pin $I_R$, through Active Head Receiver 519, Thermal Asperity Detection Correction block 503, and finally through Read Output 501 to external pins $R_{DX}$ and $R_{DY}$.

For a write operation, the desired head or heads can be selected by Head Select 509. The write signal is received at pins $W_{DX}$ and $W_{DY}$ and is coupled to Input Buffer 505. From Input Buffer 505, the signal is coupled to Active Head Driver 515, which outputs the signal to pins $W_{DAX}$ and $W_{DAY}$. The signal is then coupled through pins $W_{DX}$ and $W_{DY}$ to drivers 438 and 462. When the signal at $W_{DX}$ is high and the signal at $W_{DY}$ is low, PMOS transistor 454 is turned off, preventing current from flowing between $H_{WX}$ and $V_{CC}$. The low signal at WDY causes PMOS transistor 452 to be turned on, thereby allowing current to flow between $V_{CC}$ and $H_{WY}$. The low signal at $W_{DY}$ also turns off NMOS transistor 446 and NPN transistor 448. The high signal at $W_{DX}$ turns on NMOS transistor 460 and NPN transistor 458. Because transistor 448 is off, current travels from $V_{CC}$ through PMOS transistor 452 to $H_{WY}$. The current provided by transistor 452 to write head 456 generates a magnetic field which aligns a region of magnetic particles on the magnetic disk, and thereby stores a bit. The current is coupled to $H_{WX}$ and through transistor 458 to resistor 450 and to ground. Forcing $W_{DX}$ low and $W_{DY}$ high writes a reverse polarity magnetic field to the magnetic disk via a similar process.

The Low Voltage Fault detection circuit 511 improves data security by disabling the write current generator during a low voltage fault or power startup.

Thus, a method and apparatus for an active read/write head have been described. Although the present invention has been described with respect to certain specific embodiments, it will be clear to those skilled in the art that the inventive features of the present invention are applicable to other embodiments as well, all of which are intended to fall within the scope of the present invention.

We claim:

1. A disk drive head-arm assembly comprising:
    a vertical head;
    an interface circuit, said interface circuit having a first and a second side, wherein said interface circuit preamplifies signals from said vertical head;
    a load arm, said load arm coupled to said first side of said interface circuit;
    an interconnect, said interconnect having a first and a second side, said first side of said interconnect coupled to said interface circuit;
    said second side of said interconnect coupled to said vertical head;
    wherein said interconnect couples said signals from said vertical head to said interface circuit interconnect,
    wherein said interface circuit comprises:
    a substrate;
    an integrated circuit formed on said substrate with solder bumps in a wafer solder bump circuit fabrication process;
    said substrate is a backgrinded substrate, whereby a head-chip profile is made small.

2. The apparatus of claim 1 wherein said interface circuit further comprises:
    a read signal preamplifier; and
    a write current driver.

3. A disk drive head-arm assembly comprising:
    a vertical head;
    a load arm;
    an interconnect, said interconnect having a first and a second side, said first side of said interconnect couple to a interface circuit said second side being coupled to said vertical head;
    wherein said interface circuit preamplifies signals from said vertical head, and said interconnect couples said signals from said vertical head to said interface circuit;
    wherein said interface circuit comprises:
    a substrate;
    an integrated circuit formed on said substrate with solder bumps in a wafer solder bump circuit fabrication process;
    said substrate is a backgrinded substrate, whereby a head-chip profile is made small.

4. The apparatus of claim 3 wherein said interface circuit further comprises:
    a read signal preamplifier; and
    a write current driver.

* * * * *